A. A. LOVELL.
Cement Pipe-Traps.

No. 144,277.  Patented Nov. 4, 1873.

WITNESSES.  INVENTOR.
E. E. Moore  Albert A. Lovell
F. L. Goulding

UNITED STATES PATENT OFFICE.

ALBERT A. LOVELL, OF WORCESTER, MASSACHUSETTS.

IMPROVEMENT IN CEMENT PIPE-TRAPS.

Specification forming part of Letters Patent No. 144,277, dated November 4, 1873; application filed August 25, 1873.

*To all whom it may concern:*

Be it known that I, ALBERT A. LOVELL, of the city and county of Worcester and Commonwealth of Massachusetts, have invented certain new and useful Improvements in Cement Traps for Drain-Pipes; and I do hereby declare the following to be a full, clear, and exact description of the same, reference being had to the accompanying drawings, which form a part of this specification, and in which—

Figures 1, 2:
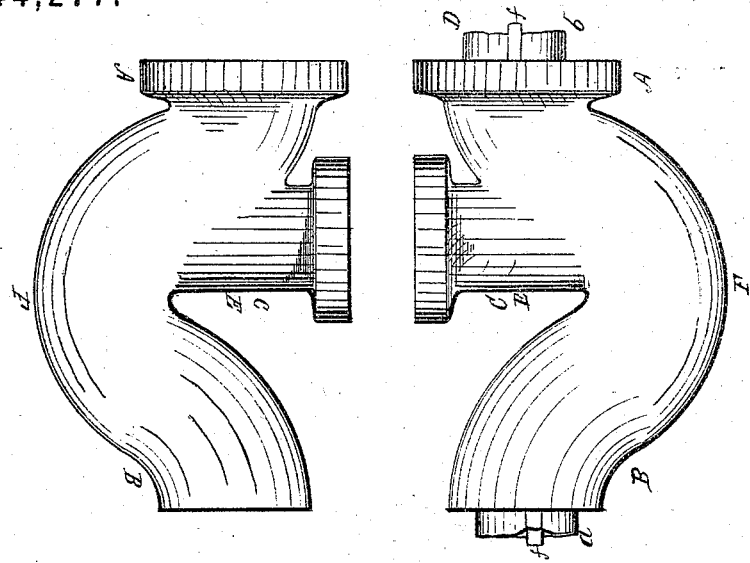
Figures 3, 4:
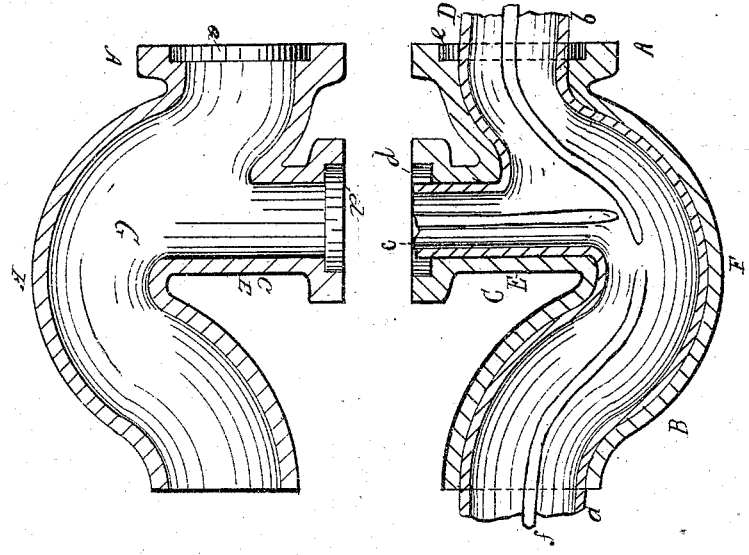

Figure 1 represents a side view of my improved cement trap for drain-pipes and for other purposes. Fig. 2 represents a side view of the same trap before the internal core or casing has been removed, as will be hereafter more fully explained. Fig. 3 represents a longitudinal central section of the trap shown in Fig. 1; and Fig. 4 represents a similar section of the trap and its core, shown in Fig. 2.

To enable those skilled in the art to which my invention belongs to make and use the same, I will proceed to describe it in detail.

As cement traps have been heretofore made, it was necessary to make them in sections, since the molding-core could not be removed. The ends A B were, therefore, one or both, made or molded separately from the center part C, and afterward stuck to or cemented to the part C.

This mode of making or manufacturing cement traps was found to be very objectionable, since the trap was not strong, nor were the ends even and true, while the mode of manufacturing was expensive and inconvenient.

In the manufacture of my improved cement traps for drain-pipes and other purposes, I first make a hollow or trap core, D, of plaster-of-paris, or other suitable material, the ends $a$ $b$ of which are long enough to project some distance beyond the ends of the trap to be made. This core is made in two parts, and can, therefore, be readily molded and formed by molds and cores which open longitudinally in the center, and the core is formed in two parts; but after it has been made the two parts are united carefully and evenly by plaster-of-paris or cementing material, and such core is then placed within another mold made in two parts, and which mold is as much larger than the core as the desired thickness of the trap to be made. Each end of such mold is provided with two or more adjusting-screws or adjusting-pins, whereby the core D can be adjusted and held in the desired central position within the core. The cement, by preference, is then run or tamped in a plastic state, to first form the upright part E, and then descending to form the belly or trap part F, after which a cap is secured onto the upright part of the mold, having a projection to fit around the upright part $c$ of the core D, to form the socket $d$. The mold is then turned on a pivot near its center, to bring one of the ends of the mold to a vertical position, by preference, the end $b$ of the core D. The plastic cement is then run and tamped in until the socket end A of the trap is formed, after which the cap is secured onto the mold, which fits around the end $b$ of core D, and forms the socket $e$. The mold is then turned back, so as to bring the end thereof into a vertical position, after which the plastic cement is turned and tamped in to form the end B of the trap.

After the cement has remained in the mold a sufficient length of time "to set," the divided mold is removed and the shell-core D chipped or broken out by suitable tools, which leaves a neat, strong, and uniform cement trap, made in one piece, and having a smooth and uniform opening, G.

To render the removal of core D more expeditious and easy, breaking or separating irons $f$ $g$, of the same thicknes as the core to be formed, are put into the mold before the core D is formed, and are thereby made to form a portion of the body of the core, and consequently a slight rap of the hammer or other tool upon the ends of such irons will cause them to separate and fall out, thus leaving core D in several parts, whereby the chipping or separating process is expedited. In some classes of work, if preferred, core D may be made entirely of cement or other suitable material, and allowed to remain in the trap.

In lieu of screws to support the core D upon its under side, small removable rests may be employed, and which rests are removed when the ends of the trap are formed.

Those skilled in the art of working and laying cement drain-pipe will readily appreciate the utility and practical advantage of my invention.

Having described my improvements in cement traps for drain-pipes, and for other purposes, what I claim therein, as an improved article of manufacture, is—

A cement trap for drain-pipes and other purposes formed in one piece, substantially as described and set forth.

ALBERT A. LOVELL.

Witnesses:
 E. E. MOORE,
 F. L. GOULDING.